Patented Apr. 18, 1950

2,504,446

UNITED STATES PATENT OFFICE 2,504,446

FLUORINE REMOVAL PROCESS

Mathijs H. R. J. Plusje, Beek, Netherlands, assignor to De Directie van de Staatsmijnen in Limburg, Heerlen, Netherlands No Drawing. Application July 31, 1947, Serial No. 765,262. In the Netherlands June 5, 1942

Section 1, Public Law 690, August 8, 1946
Patent expires June 5, 1962

7 Claims. (Cl. 23—102)

This invention relates to a fluorine removal process and, more particularly, it is concerned with procedures for the removal of fluorine from liquids obtained by the decomposition of raw phosphate materials using nitric acid.

A principal object of this invention is the provision of procedures for removing fluorine from liquids obtained by the decomposition of phosphates by the action of nitric acid, e. g., the liquors obtained in the acid treatment of phosphate rock as a step in the preparation of fertilizer materials. A further object is the provision of such procedures which may be accomplished without appreciable loss of any of the nitrogen content of the acidic liquors. A still further object is the provision of such fluorine removal processes which do not require the use of a filtration step or the removal of the fluorine as an insoluble precipitant. Another object is the provision of such fluorine removal processes which may be carried out in continuous manner.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

These objects are accomplished according to the process of the present invention which comprises removing the fluorine from acidic solutions comprising substantial quantities of nitrate and phosphate ions and minor quantities of fluorine ions as impurities by distilling the fluorine from the solution as hydrogen fluoride, silicon tetrafluoride, or a mixture of these gases. Distillation of the fluorine from the acidic solutions is accomplished by treatment of the solutions with steam which is regulated so that the vapor mixture is driven off from the liquid, while the liquid is at a temperature between 120° and 140° C.

The success of this invention depends to a large extent upon the discovery that fluorine can be removed by steam distillation from the subject type of acid phosphate solutions without any appreciable loss of the nitrogen content of the solutions, particularly when the temperature of the liquid during the distillation operation is maintained at a temperature between 120° and 140° C. This discovery makes possible the fluorine removal from acid phosphate liquors in fertilizer production without recourse to filtration and precipitation steps as were required by the fluorine removal procedures of the prior art, e. g., the procedures in which the fluorine is precipitated as $Na_2SiF_6$ or as $CaF_2$.

A more comprehensive understanding of the mode of operation involved in the present invention may be obtained from the following illustrative example, in which all parts are by weight.

Example

Kolaphosphate concentrated by flotation is treated with nitric acid of 53% concentration, 2200 parts of the acid being used for every 1000 parts of the phosphate. The resulting liquid with a temperature of about 110° C. is continuously supplied at the top of a column of 2 meters length which is filled with Raschig rings. Steam of 140° to 145° C. is blown into the lower end of the column, 155 to 170 parts of steam being used for each 1000 parts of liquid which originally contains 1.0% of fluorine. In the liquid leaving the tower, the amount of which is decreased due to the expelling of fluorine and water to 900 parts, the fluorine content is reduced to 0.2%. The distillate, the amount of which is increased to 270 parts due to condensate which is formed by the distillation, contains 3.0% of fluorine and only 2% of nitrogen. Therefore, the nitrogen loss is only 0.65 part per part of fluorine.

In carrying out the distillation of the fluorine from the acid liquors from which the fluorine is to be removed by means of steam, the liquors are preferably introduced at the top of the distillation tower or column and the steam is introduced at the base. By far the most efficient elimination of fluorine is accomplished by use of a continuous procedure, i. e., distilling the fluorine from the solutions by passing these solutions downwardly through a distillation column countercurrently to steam, both the flow of steam and the flow of liquid being continuous.

It has been established that the lowest nitrogen losses per unit of fluorine are obtained if the vapor mixture is separated from the liquid at a temperature between 120° and 140° C. When using a distillation column, care should be taken that such a temperature prevails in the top. The percentage of fluorine expelled increases with the amount of steam which is passed through the solution and with the length of the column.

It has been further found that nitrogen losses during the distillation procedure are affected by the nitrate concentration of the solution. Thus, the nitrate concentration should be low. In operation of the process, the reduction of nitrate concentration can be accomplished by crystallizing calcium nitrate from the acid phosphate liquors prior to the distillation, or the nitrate concentration may be reduced by dilution of the solution, such as by the addition of a calcium nitrate solution of lower concentration.

The present invention may be employed with a cyclic process using a continuous mode of operation for the treatment of raw phosphates with nitric acid. In such cyclic operations the raw phosphate is contacted with nitric acid, preferably in an amount which is so restricted that decomposition is only just possible, i. e., from 2 to 4 mols of acid for each mol of tricalcium phosphate in the raw phosphate material, plus an additional amount of acid to compensate for the impurities in the raw material. At the same time, a solution is added with a low calcium nitrate content as compared with the liquid resulting from the reaction between raw phosphate and nitric acid. When the decomposition reaction has come to an end, fluorine is distilled from the liquid which is then divided into two portions. One portion is withdrawn and used for producing fertilizers, the other portion is freed from part of its calcium nitrate content, e. g., by cooling, and is then, together with nitric acid allowed to react with further raw phosphate. The cycle is then repeated.

The division of the reaction mixtures into two portions may also follow immediately after the end of the decomposition reaction, the removal of fluorine being effected only in the portion withdrawn for producing fertilizers. It is to be recommended to add all or part of the nitric acid to the circulating solution before cooling the solution in order to remove the calcium nitrate. This prevents the crystallization of monocalcium phosphate.

The acid solution which is withdrawn from the cycle is neutralized, generally with ammonia. If fertilizers with a hydrogen content are desired, an extra amount of nitric acid can be added to the solution before neutralization.

The steam developed during neutralization can be used for distilling fluorine in the preceding stage of the process. The distillation column for that purpose may be connected at its lower end with the neutralization apparatus.

For the formation of $SiF_4$ a certain amount of $SiO_2$ is required. If the raw phosphate does not contain sufficient $SiO_2$, some fine sand or such like material must be suspended in the reaction mixture. Instead of sand, the flocculent precipitate separated from the distillate can also be used.

Various types of raw phosphate materials containing appreciable quantities of calcium and phosphate content may be treated by the present procedures. Examples of suitable materials for this purpose are Florida pebble or plate rock phosphate, Canadian apatite, Tennessee brown rock phosphate, Curacao phosphate, Makatea phosphate, and similar natural products. Likewise, mixtures of the materials may be used or synthetically produced or by-product calcium phosphate products or mixtures thereof may be utilized. Such materials have been referred to throughout the specification and in the pending claims as raw phosphate materials.

I claim:
1. Method of removing fluorine from acidic solutions containing nitrate and phosphate ions, obtained by dissolving raw phosphate material in nitric acid, which comprises steam distilling the fluorine from the solutions in the form of a material selected from the group consisting of HF and $SiF_4$, by treatment with steam so that the vapor mixture leaves the liquid at a temperature between 120 and 140° C.

2. Method of removing fluorine from acidic solutions containing nitrate and phosphate ions obtained by decomposition of fluorine containing raw phosphate materials with nitric acid which comprises steam distilling the fluorine from the solutions in the form of a material selected from the group consisting of HF and $SiF_4$, the distillation being performed in a stage of the process wherein the nitrate concentration is lower than that obtained from the dissolution of phosphate rock in nitric acid.

3. Method of removing fluorine from acidic solutions, containing nitrate and phosphate ions, obtained by a cyclic process for the decomposition of fluorine-containing raw phosphate materials with nitric acid, which comprises steam distilling the fluorine from the solutions in the form of a material selected from the group consisting of HF and $SiF_4$ by countercurrent treatment with steam, the distillation being performed in a stage of the process wherein the nitrate concentration is lower than that obtained from the dissolution of phosphate rock in nitric acid.

4. Method of removing fluorine from acidic solutions containing nitrate ions obtained by decomposition of fluorine containing raw phosphate materials with nitric acid, which comprises steam distilling the fluorine from the solutions in the form of a material selected from the group consisting of HF and $SiF_4$, the decomposition being carried out in a cyclic process so that the raw phosphate is contacted with nitric acid while adding a solution with a low calcium nitrate content as compared with the liquid to be obtained from the raw phosphate and the nitric acid only, the fluorine being distilled from the reaction mixture and the said reaction mixture being then divided into two portions one of which is withdrawn for the production of a fertilizer, the other portion being recycled after removal of calcium nitrate therefrom, and addition of nitric acid thereto for treating a new portion of raw phosphate.

5. Method of removing fluorine from acidic solutions containing nitrate and phosphate ions, obtained by dissolving raw phosphate material in nitric acid, which comprises adding $SiO_2$ to said solution and distilling the fluorine from the solution in the form of $SiF_4$ and HF by treatment with steam.

6. Method of removing fluorine from acidic solutions containing nitrate ions obtained by decomposition of fluorine containing raw phosphate materials with nitric acid, which comprises steam distilling the fluorine from the solutions in the form of a material selected from the group consisting of HF and $SiF_4$, the decomposition being carried out in a cyclic process so that the raw phosphate is contacted with nitric acid while adding a solution with a low calcium nitrate content as compared with the liquid to be obtained from the raw phosphate and the nitric acid only, the reaction mixture being then divided into two portions, one of which is subjected to the fluorine removal treatment and thereupon withdrawn for the production of a fertilizer, the other portion being recycled after removal of calcium nitrate therefrom and addition of nitric acid thereto for treating a new portion of raw phosphate.

7. In a continuous cyclic process for the manufacture of fertilizer materials from raw phosphate materials, the steps which comprise decomposing raw phosphate materials with nitric acid, adding a solution having a low calcium nitrate content as compared with the reaction mixture obtained by said decomposing step, said solution being obtained from a succeeding step in the process, as hereinafter defined, dividing the resulting mixture into two portions, steam distilling fluorine from the first of said portions in the form of a material from the group consisting of HF and SiF$_4$, withdrawing said first portion for transformation into fertilizer, removing calcium nitrate from the second of said portions and recycling the second portion for admixture with the decomposition mixture of phosphate material and nitric acid as hereinbefore defined.

MATHIJS H. R. J. PLUSJE.

REFERENCES CITED

The following references are of record in the file of this patent:

UNITED STATES PATENTS

| Number | Name | Date |
|---|---|---|
| 1,058,145 | Braun | Apr. 8, 1913 |
| 1,517,687 | Voerkelius | Dec. 2, 1924 |
| 2,165,100 | Hettrick | July 4, 1939 |

Certificate of Correction

Patent No. 2,504,446 April 18, 1950

MATHIJS H. R. J. PLUSJE

It is hereby certified that error appears in the printed specification of the above numbered patent requiring correction as follows:

Column 3, line 46, for the word "hydrogen" read *high nitrogen*;

and that the said Letters Patent should be read as corrected above, so that the same may conform to the record of the case in the Patent Office.

Signed and sealed this 31st day of October, A. D. 1950.

[SEAL]

THOMAS F. MURPHY,
*Assistant Commissioner of Patents.*